UNITED STATES PATENT OFFICE.

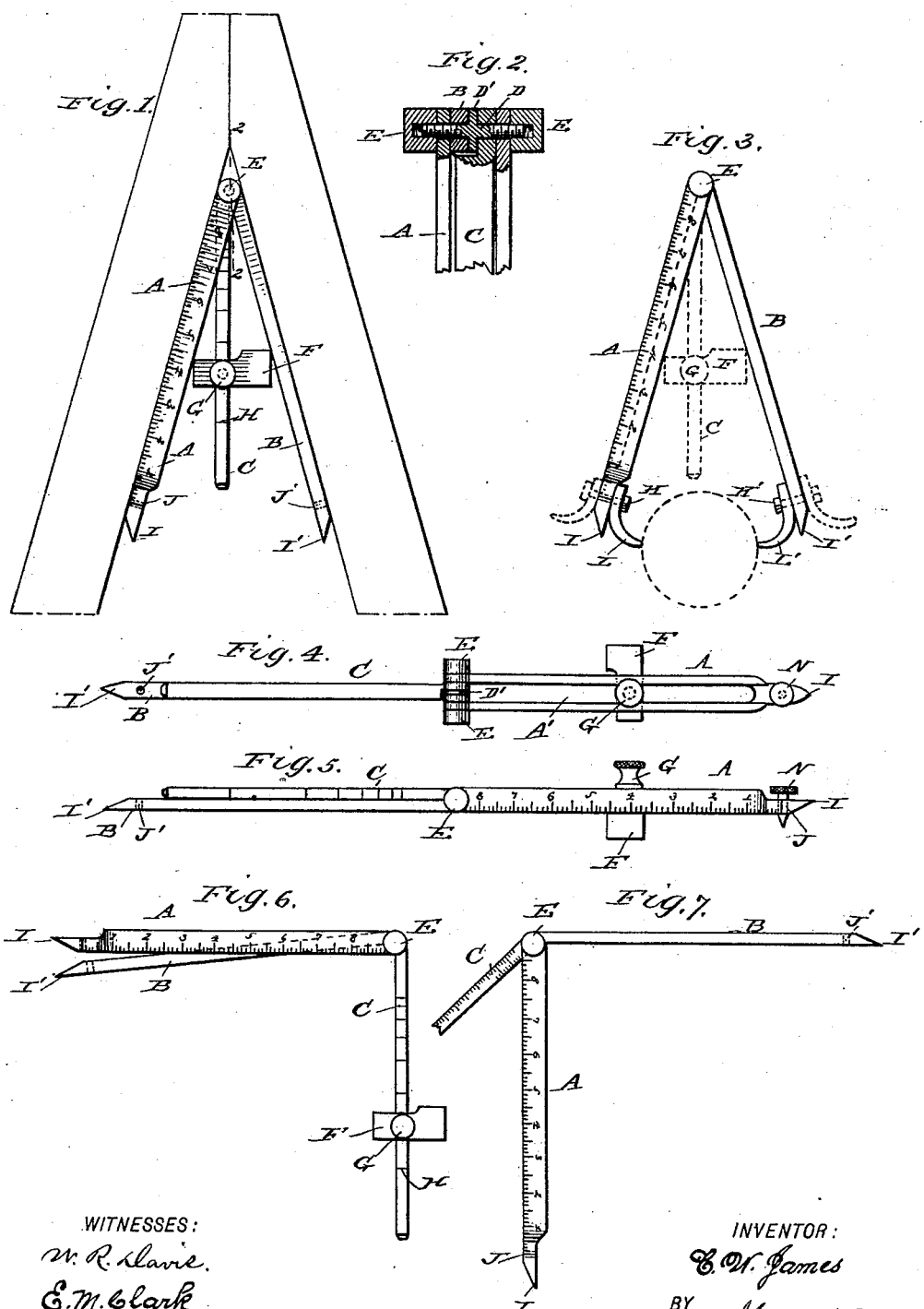

CHARLES WILLIS JAMES, OF PHILADELPHIA, PENNSYLVANIA.

MEASURING AND DRAWING INSTRUMENT.

SPECIFICATION forming part of Letters Patent No. 453,906, dated June 9, 1891.

Application filed January 15, 1891. Serial No. 377,797. (No model.)

*To all whom it may concern:*

Be it known that I, CHARLES WILLIS JAMES, of West Philadelphia, in the county of Philadelphia and State of Pennsylvania, have invented a new and Improved Measuring and Drawing Instrument, of which the following is a full, clear, and exact description.

The object of the invention is to provide a new and improved instrument designed for measuring and drawing purposes, which is simple and durable in construction, can be readily manipulated to obtain or measure inside or outside angles and obtain the miters of them, or used for calipering, or arranged as a depth and end marking gage, dividers, compasses, &c.

The invention consists of three arms jointed at a common pivot, and of which arms the middle one carries an adjustable block adapted to engage the other two arms.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a side elevation of the improvement as applied to take an inside angle and its miter. Fig. 2 is an enlarged transverse section of the same on the line 2 2 of Fig. 1. Fig. 3 is a side elevation of the improvement as arranged as a pair of calipers. Fig. 4 is a plan view of the improvement as arranged as a marking-gage. Fig. 5 is a side elevation of the same. Fig. 6 is a side elevation of the improvement as arranged as a depth-gage, and Fig. 7 is a like view of the improvement as arranged for a combination square and bevel.

The improved measuring and drawing instrument is provided with three arms A, B, and C, jointed together at a pivot D, having in its center an annular flange D', separating the arms B and C from each other. The arm A is forked, as is plainly shown in Fig. 2, and the outer ends of the forks hung on the pivot D, which latter is provided near its outer ends with threads engaged by nuts E, adapted to abut against the outside of the members of the forked end of the arm A, as is plainly indicated in Fig. 2. By adjusting the nuts E the several jointed ends of the arms A B C are pressed upon to lock the said arms in the respective positions they may have.

On the arm C is fitted to slide a block F, adapted to be secured in place on the said arm C by means of a set-screw G. The block F is adapted to indicate on a graduation H, previously ascertained, and representing degrees and subdivisions of angles measured by the outer edges of the arms A and B, as is plainly indicated in Fig. 1.

When taking the inside angle and miter of an article, as is shown in Fig. 1, the set-screw G is loosened, so that the block F can be adjusted on the arm C, which now extends between the two arms A and B, so that the outer ends of the block F can come in contact with the inside edges of the arms A and B. The latter are placed with their outer edges against the inside of the arms, the angle of which is to be measured, as shown in Fig. 1. Then the block F is moved toward the pivot D until the ends of the block F firmly press the two arms A and B against the arms of the article to be measured, after which the set-screw G is adjusted so as to secure the block F in place on the arm C. The degrees of the angles are indicated by the arms A and B, and can be read at the graduation H at the block F. The instrument is taken from the article to be measured, and the arms A and B can at any time be swung against the block F, so as to always indicate the respective angle. In measuring an outside angle the instrument is placed on the top of the article to be measured, so that the outer edges of the arms A and B extend in line with the outside angle of the article, when the block F is adjusted on the arm C, and fastened in place by the set-screw G.

The arms A and B are provided or formed at their lower ends with points I and I', so that by removing the block F from the rod C and folding the latter into the forked arm A the device can be used as a pair of dividers, the two arms A and B being locked in the proper position by adjusting-nuts E. By fastening a lead-pencil in the lower end of the forked arm A the device may be used as a compass.

In the outer ends of the arms A and B, at or near the points I and I', respectively, are formed threaded apertures J and J', respectively, adapted to be engaged by screws K and K', respectively, serving to fasten curved finger-pieces L and L' to the respective arms, so that the device can be used for inside or outside calipers, as is plainly illustrated in Fig. 3.

As illustrated in Figs. 4 and 5 the instrument may be used for a marking-gage, the arm A then being only used with the block F, and the set-screw G in connection with a pointed screw N, screwing in the threaded aperture J in the arm A. In this case the block F is detached from the arm C, and the latter is swung onto the arm B, both being extended in line with the arm A. The block F is placed on the under side of the forked arm A. The set-screw G is engaged with the said block F from the top of the arm, so that the head of the set-screw bears against the top of the arm A, and thus draws the block F against the under side of the arm A. The block F, by loosening the set-screw G, can be moved forward and backward on the arm A, so as to bring the block in a proper position relative to the point of the pointed screw N. It is understood that the shank of the set-screw G passes through the fork A' of the arm A. The latter is provided on one side with a graduation indicating inches and subdivisions. The graduation begins at the center of the set-screw N, as is plainly indicated in Fig. 5.

As is shown in Fig. 6 the device can be used as a depth-gage. In this case the arm C is used in connection with the block F and set-screw G, the arms A and B serving as a handle. The block F is adjusted on the arm C at the desired point, so that that part of the arm C, extending downward from the block F to the end of the arm C, indicates the depth of the article measured.

As shown in Fig. 7, the arms A, B, and C can be placed in such a relative position to each other and fastened by the nuts E to form any desired bevel. In order to form a square, the arms A and B are extended in line with each other, and the block F is moved inward on the arm C until the arms A and B rest flat on the upper edge of the block, so that the arm C stands at right angles to both arms A and B. The device may also be used for other purposes.

Having thus fully described my invention, I claim as new and desired to secure by Letters Patent—

1. In a measuring and drawing instrument, the combination, with a forked arm, of two arms, each pivoted at one end between the members of the forked arm, and one of the said arms being of a length equal to that of the said forked arm, substantially as described.

2. In a measuring and drawing instrument, the combination of a forked arm, two arms of unequal length pivoted between the members of the forked arm, the longer arm being of a length equal to that of the forked arm, and a block adjustably secured to one of the said arms, substantially as herein shown and described.

3. In a measuring and drawing instrument, the combination of a forked arm, two arms of unequal length pivoted between the members of the forked arm, the shorter arm being graduated to indicate degrees and subdivisions of angles and the longer arm being of a length equal to that of the forked arm, and a block adjustably secured on the graduated arm, substantially as described.

4. In a measuring and drawing instrument, the combination, with a forked arm, of a pivot having a central flange and screw-threaded ends, nuts on the ends of the pivot, an arm on each side of the flange of the pivot between the members of the forked arm, and a block adjustably secured on one of the said arms, substantially as herein shown and described.

5. A measuring and drawing instrument comprising three arms, a pivot for joining the said three arms, and tightening-nuts screwing on the said pivot to lock the said three arms in place, substantially as shown and described.

6. A measuring and drawing instrument comprising three arms, a pivot for joining said three arms, tightening-nuts held on the said pivot and serving to lock the said arms in place, and curved finger-pieces adapted to be secured to the free ends of two of the said arms, substantially as shown and described.

CHARLES WILLIS JAMES.

Witnesses:
 OWEN H. HUNTER,
 FRANK MCBRIDE.